United States Patent
Coats et al.

(10) Patent No.: US 10,900,565 B2
(45) Date of Patent: Jan. 26, 2021

(54) LOST MOTION TRANSMISSION SHIFTER

(71) Applicants: Caleb Coats, Royal Oak, MI (US); James Ruiz, Utica, MI (US); Michael Perecki, Brownstown, MI (US); Brian J Jacobs, Romeo, MI (US)

(72) Inventors: Caleb Coats, Royal Oak, MI (US); James Ruiz, Utica, MI (US); Michael Perecki, Brownstown, MI (US); Brian J Jacobs, Romeo, MI (US)

(73) Assignee: FCA US LLC, Auburn Hills, MI (US)

( * ) Notice: Subject to any disclaimer, the term of this patent is extended or adjusted under 35 U.S.C. 154(b) by 281 days.

(21) Appl. No.: 15/961,042

(22) Filed: Apr. 24, 2018

(65) Prior Publication Data

US 2018/0328489 A1 Nov. 15, 2018

Related U.S. Application Data

(60) Provisional application No. 62/504,740, filed on May 11, 2017.

(51) Int. Cl.
  *F16H 63/34* (2006.01)
  *B60T 1/00* (2006.01)
  *F16D 63/00* (2006.01)
  *B60T 1/06* (2006.01)

(52) U.S. Cl.
  CPC .......... *F16H 63/3491* (2013.01); *B60T 1/005* (2013.01); *B60T 1/062* (2013.01); *F16D 63/006* (2013.01); *F16H 63/3425* (2013.01); *F16H 63/3483* (2013.01)

(58) Field of Classification Search
  None
  See application file for complete search history.

(56) References Cited

U.S. PATENT DOCUMENTS

| 6,481,556 | B1* | 11/2002 | Haupt | F16H 63/3491 |
|---|---|---|---|---|
|  |  |  |  | 192/219.5 |
| 6,918,314 | B2 | 7/2005 | Wang |  |
| 7,743,901 | B2 | 6/2010 | Hayashi et al. |  |
| 8,161,837 | B2 | 4/2012 | Giefer et al. |  |
| 8,281,681 | B2 | 10/2012 | Kimura et al. |  |
| 8,955,408 | B2 | 2/2015 | Tarver |  |

(Continued)

FOREIGN PATENT DOCUMENTS

DE 202017107360 U1 1/2018

*Primary Examiner* — Charles A Fox
*Assistant Examiner* — Ryan P Dodd
(74) *Attorney, Agent, or Firm* — Ralph E Smith

(57) ABSTRACT

A transmission includes a housing, a park gear, and a vehicle park shifting system configured to selectively engage the park gear to shift the transmission into and out of a park position. The vehicle park shifting system includes a linkage operably associated with the park gear, an actuator assembly operably coupled to the linkage and configured to be actuated to selectively move the linkage into and out of engagement with the park gear, and a lost motion manual shifter assembly operably coupled to the linkage and including a shift shaft disposed at least partially within the housing. The shift shaft is configured to couple to a manual park release system utilized to manually shift the transmission into and out of park without utilizing the actuator assembly. Actuation of the actuator assembly does not impart rotational movement to the shift shaft.

12 Claims, 6 Drawing Sheets

(56) References Cited

U.S. PATENT DOCUMENTS

| | | | |
|---|---|---|---|
| 2014/0251750 A1* | 9/2014 | List | B60T 1/005 |
| | | | 192/219.5 |
| 2015/0252897 A1* | 9/2015 | Kristofcsak | F16H 63/3416 |
| | | | 192/219.5 |
| 2015/0308571 A1* | 10/2015 | Wyatt | F16H 63/3491 |
| | | | 192/219.5 |
| 2016/0318496 A1* | 11/2016 | McCash | B60T 13/22 |
| 2017/0363168 A1 | 12/2017 | Spaulding et al. | |
| 2018/0195603 A1* | 7/2018 | Nava Gonzalez | F16H 1/222 |

* cited by examiner

LOST MOTION TRANSMISSION SHIFTER

CROSS REFERENCE TO RELATED APPLICATION

This application claims the benefit of U.S. Provisional Patent Application Ser. No. 62/504,740, filed May 11, 2017, the contents of which are incorporated herein by reference thereto.

FIELD

The present application relates generally to transmission shifter systems and, more particularly, to a lost motion shifter device for electronic or hydraulic park shift systems.

BACKGROUND

Some conventional vehicles include electronically shiftable transmissions. If the vehicle power system loses charge in such vehicles, the driver cannot shift the transmission out of park with an electronic vehicle shifter. Instead, the driver must manually engage or disengage a park pawl mounted to the transmission in order to shift the transmission out of park, for example, when the vehicle needs to be towed. However, conventional electrically and hydraulically actuated park systems rotate a lever outside of the transmission housing even when actuated internally. Debris lodged in external components may prevent such external lever motion and prevent normal shifting operation. Thus, while such manual park release systems work well for their intended purpose, there remains a desire for improvement in the relevant art.

SUMMARY

In accordance with one example aspect of the invention, a transmission is provided. In one example implementation, the transmission includes a housing, a park gear, and a vehicle park shifting system configured to selectively engage the park gear to shift the transmission into and out of a park position. The vehicle park shifting system includes a linkage operably associated with the park gear, an actuator assembly operably coupled to the linkage and configured to be actuated to selectively move the linkage into and out of engagement with the park gear, and a lost motion manual shifter assembly operably coupled to the linkage and including a shift shaft disposed at least partially within the housing. The shift shaft is configured to couple to a manual park release system utilized to manually shift the transmission into and out of park without utilizing the actuator assembly. Actuation of the actuator assembly does not impart rotational movement to the shift shaft.

In addition to the foregoing, the described transmission may include one or more of the following: a shaft hub disposed about the shift shaft, and a lever hub disposed at least partially about the shift shaft, wherein rotation of the shift shaft by the manual park release system causes rotation of the shaft hub, which engages and rotates the lever hub to thereby move the linkage out of engagement with the park gear; wherein the shaft hub includes a first tab that engages a second tab of the lever hub to transfer rotational movement therebetween; and a biasing mechanism disposed about the shift shaft and engaged with the housing and the shaft hub, the biasing mechanism configured to bias the shaft hub and the shift shaft into a park position disengaged from the lever hub.

In addition to the foregoing, the described transmission may include one or more of the following: wherein the lost motion manual shifter assembly further includes a coil pin extending through the shaft hub and the shift shaft to couple the shaft hub to the shift shaft; wherein the linkage includes a lever and hub assembly, the lever and hub assembly includes a lever coupled to the lever hub and rotatable about the shift shaft with the lever hub; and wherein the actuator assembly includes a hydraulic actuator, a piston, and a piston biasing mechanism, wherein the piston biasing mechanism biases the piston into a first position where the piston engages the lever and moves the linkage into engagement with the park gear, and wherein hydraulic pressure supplied to the hydraulic actuator moves the piston into a second position where the piston engages the lever and moves the linkage out of engagement with the park gear.

In addition to the foregoing, the described transmission may include one or more of the following: wherein the linkage further includes a park rod assembly comprising a park rod having a first end coupled to the lever, and a second end, a cam member disposed at least partially about the park rod second end, and a cam biasing mechanism configured to bias the cam member outwardly away from the park rod second end.

In addition to the foregoing, the described transmission may include one or more of the following: wherein the cam member includes a ramped outer surface; a guide assembly coupled to the housing and defining a guide surface to receive and guide the cam member; wherein the linkage further includes a park pawl rotatably coupled about a pivot pin, wherein the park pawl includes an engagement arm engaged with the cam member, and an engagement tooth configured to selectively engage the park gear; and wherein the transmission is an electronic shift-by-wire transmission, and the vehicle park shifting system is a hydraulic vehicle park shifting system with an electronically controlled actuator assembly.

In accordance with another example aspect of the invention, a vehicle is provided. In one example implementation, the vehicle includes a manual park release system and a transmission. The transmission includes a housing, a park gear, and a vehicle park shifting system configured to selectively engage the park gear to shift the transmission into and out of a park. The vehicle park shifting system includes a linkage operably associated with the park gear, an actuator assembly operably coupled to the linkage and configured to be actuated to selectively move the linkage into and out of engagement with the park gear, and a lost motion manual shifter assembly operably coupled to the linkage and including a shift shaft disposed at least partially within the housing. The shift shaft is coupled to the manual park release system to manually shift the transmission into and out of park without utilizing the actuator assembly. Actuation of the actuator assembly does not impart rotational movement to the shift shaft.

In addition to the foregoing, the described vehicle may include one or more of the following: wherein the manual park release system comprises a release lever coupled to the shift shaft, a manual park release mechanism configured to be manipulated by a driver, and a manual release cable coupled between the release lever and the manual park release mechanism; a biasing mechanism operably associated with the manual release cable to bias the release lever into a first position; and wherein the transmission is an electronic shift-by-wire transmission, and the vehicle park shifting system is a hydraulic vehicle park shifting system with an electronically controlled actuator assembly.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

Figure 1:
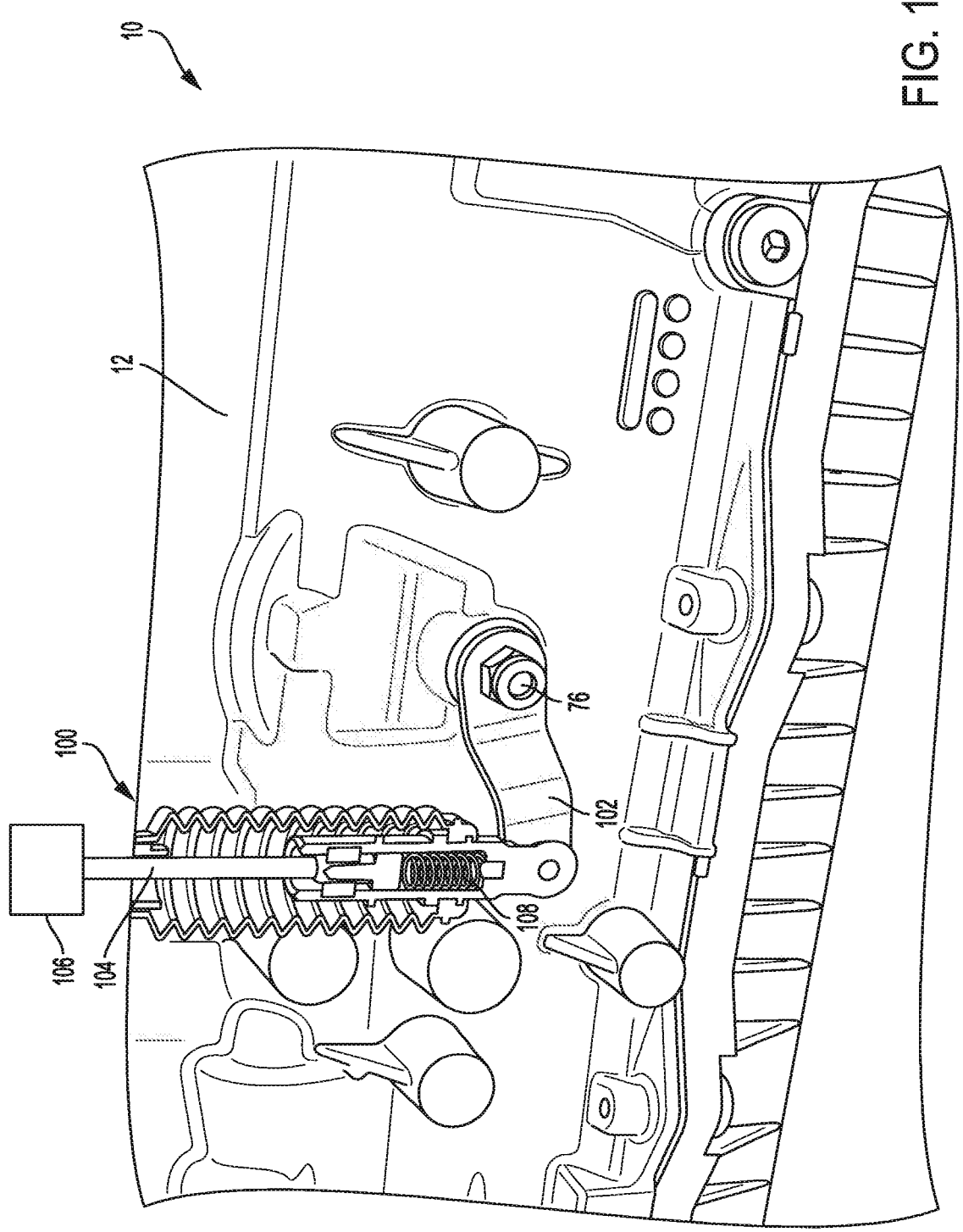
FIG. 1 is a perspective view of an example transmission in accordance with the principles of the present application.

With general reference to the Figures, and with initial reference to FIG. 1, an example transmission is illustrated and generally identified at reference numeral 10. In the example embodiment, transmission 10 is an electronically and/or hydraulically actuated or shiftable transmission. However, it will be appreciated that transmission 10 is not limited to an electronically/hydraulically variable transmission. Transmission 10 includes a housing 12 configured to house a vehicle park shifting system 14 (FIG. 2) operably associated with one or more components of the transmission 10.

Although not specifically shown, transmission 10 is linked to an engine and/or an onboard battery system through one or more output shafts. Rotational output from the engine or battery system is received by transmission 10 through a torque converter assembly. The torque converter assembly then transfers rotational output through a gear set to a transmission output, and then on to a drivetrain of the motor vehicle.

In the example embodiment, transmission 10 is operably coupled to an electronic shifter (not shown) of the vehicle. Typical transmission gears to be selected are park (P), reverse (R), neutral (N), and drive (D). However, the electronic shifter does not include a mechanical cable or link to the transmission 10. Instead, the electronic shifter is in signal communication with the transmission 10 for shifting gears thereof. Thus, the transmission 10 requires the ability to mechanically shift the transmission 10 into and out of park in situations such as where the electronical shiftable transmission malfunctions, the vehicle experiences a complete loss of power, emergencies (accidents/towing), the electronic shifter is inoperable, during service, or other situations.

Figure 2:
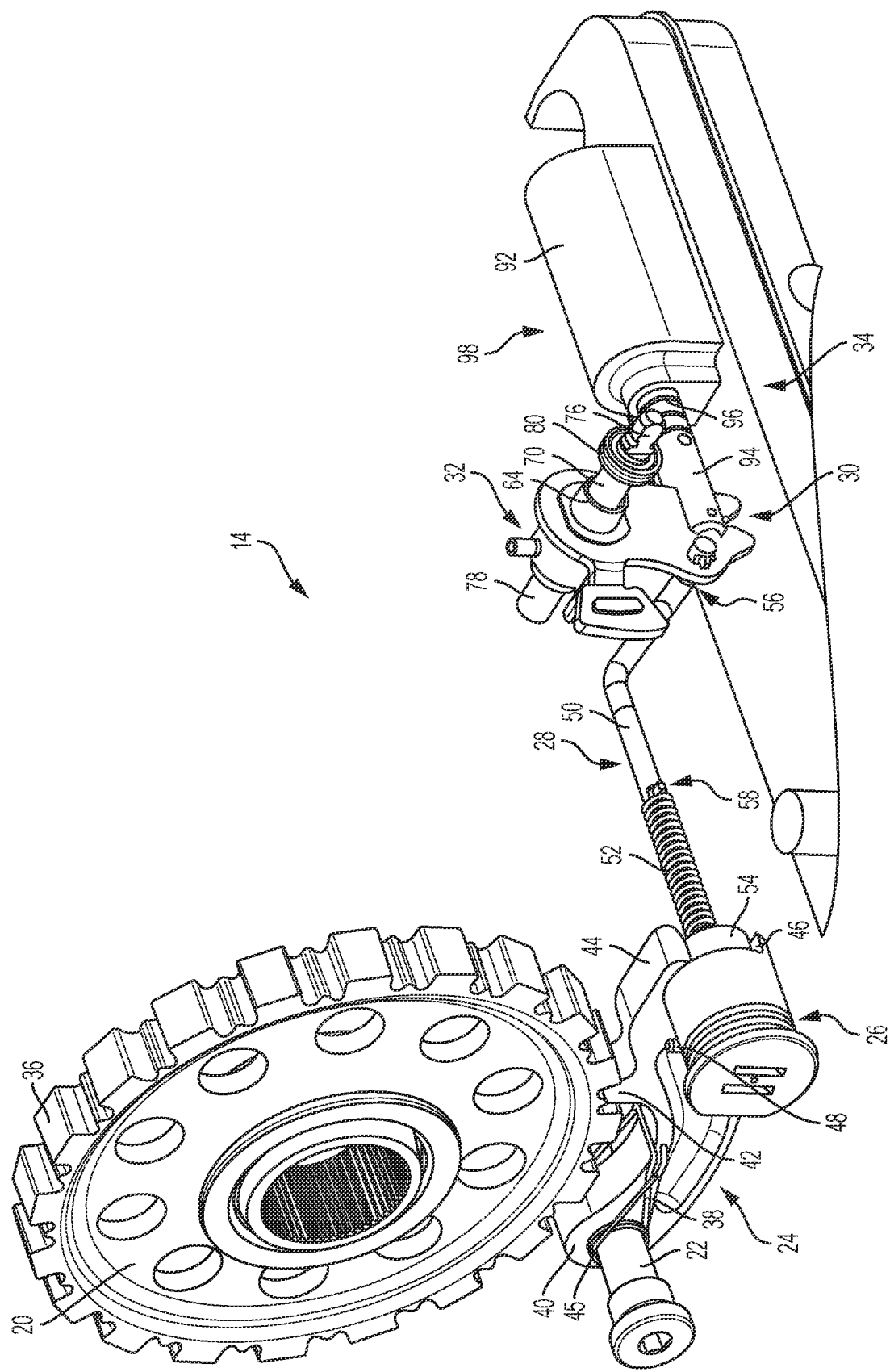
FIG. 2 is a perspective view of an example park system that may be housed within the transmission shown in FIG. 1, in accordance with the principles of the present application.
Figure 3:
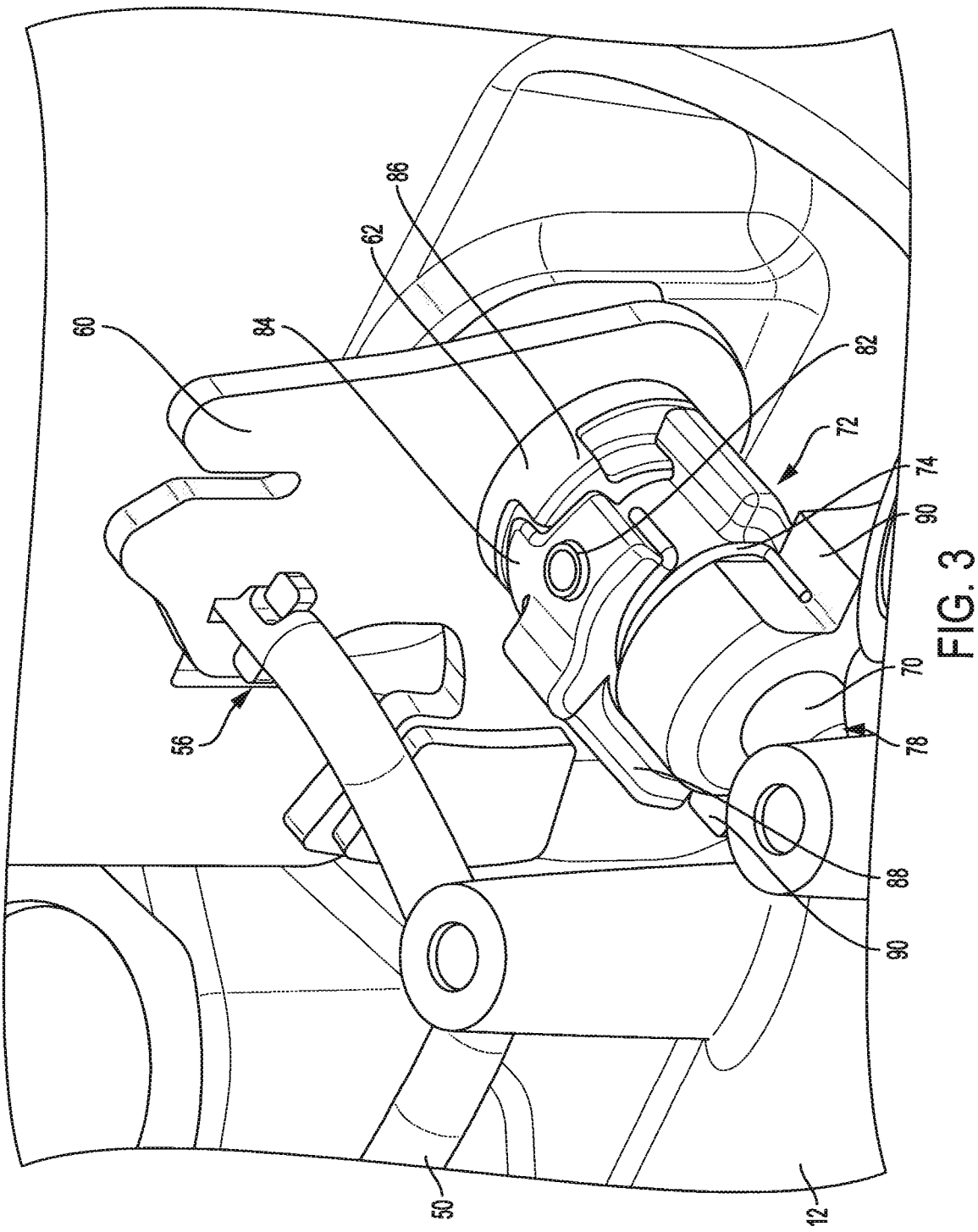
FIG. 3 is an enlarged bottom view of a portion of the park system shown in FIG. 2, in accordance with the principles of the present application.

Accordingly, with further reference to FIGS. 1-3, transmission housing 12 is configured to house vehicle park shifting system 14. A manual park release system 100 is disposed external to transmission housing 12 and is coupled to a portion 76 of a shifter pin 70 of the vehicle park shifting system 14 (see FIG. 1). The manual park release system 100 is utilized to manually shift transmission 10 into and out of park. In one example, the manual park release system includes a release lever 102 coupled to pin portion 76, and the lever 102 is coupled to a push and/or pull cable 104. Pushing or pulling the cable 104 rotates the release lever 102, which causes rotation of shift pin portion 76 to thereby manually drive or shift the transmission 10 into and out of park.

With continued reference to FIG. 2, vehicle park shifting system 14 is configured to move the transmission 10 into and out of park either manually (via the manual park release system 100) or electronically/hydraulically. Vehicle park shifting system 14 generally includes a park gear 20, a pivot pin 22, a park pawl 24, a guide assembly 26, a park rod assembly 28, a lever and hub assembly 30, a lost motion manual shifter assembly 32, and an actuator assembly 34.

In the example embodiment, the park gear 20 is directly connected to the output shaft of the transmission 10 and includes a toothed outer profile 36. The pivot pin 22 is rotatably supported by the transmission housing 12 and is coupled to the park pawl 24. A biasing mechanism or pawl return spring 38 is disposed at least partially about pivot pin 22 and is connected to park pawl 24.

In the example embodiment, park pawl 24 is configured to rotate about pivot pin 22 and generally includes a proximal end 40, an engagement tooth 42, and a distal arm 44. Proximal end 40 includes an aperture 45 configured to receive pivot pin 22 such that park pawl is rotatable about pivot pin 22 between a park position (shown in FIG. 2) and an out-of-park position (not shown). Engagement tooth 42 is configured to be selectively disposed between adjacent teeth of the park gear toothed outer profile 36 to prevent rotation of the park gear 20 and thus the transmission output shaft. Pawl return spring 38 is configured to bias park pawl 24 rotatably downward (as shown in FIG. 2) to assist moving the park pawl 24 out of the park position (shown in FIG. 2). As such, park pawl 24 selectively engages the park gear 20 to facilitate prevent rotation thereof.

In the example embodiment, guide assembly 26 is secured to housing 12 and includes a guide surface 46 and a set screw 48 configured to prevent movement and/or rotation of guide assembly 26 within transmission housing 12.

In the illustrated example, park rod assembly 28 generally includes a park rod 50, a biasing mechanism 52, and a generally cam-shaped member 54. Park rod 50 includes a first end 56 coupled to the lever and hub assembly 30, and a second end 58 coupled to the cam member 54. The biasing mechanism 52 is disposed about the rod second end 58 and is configured to bias the cam member 54 away from the second end 58 (i.e., toward guide assembly 26). The park rod 50 is configured to slide the cam member 54 along the guide surface 46 to engage the park pawl distal arm 44. As illustrated, cam member 54 is ramped such that park pawl distal arm 44 rides along the ramped outer surface when park rod 50 is pushed/pulled. Such movement causes park pawl 24 to rotate upwardly into the park position or downwardly into the out-of-park position.

As such, cam member 54 shuttles in and out of the park guide assembly 26 to engage and disengage the park pawl 24. The cam member 54 is ramped and, when pulled out of the park position, enables the park pawl 24 to rotate downward out of the park gear position. When pushed into the park position, the ramp pushes park pawl 24 up into engagement with park gear 20. If the park pawl 24 is on a park gear tooth 36, biasing mechanism 52 biases the cam member 54 into the engaged position to push engagement tooth 42 between adjacent gear teeth 36 when park gear 20 is slightly rotated.

With further reference to FIG. 3, in the example embodiment, the lever and hub assembly 30 generally includes a lever 60 coupled to a lever hub 62. The lever 60 is coupled to both the park rod first end 56 and the actuator assembly 34. The lever hub 62 includes an aperture 64 configured to receive a portion of the lost motion manual shifter assembly 32.

Figure 4:
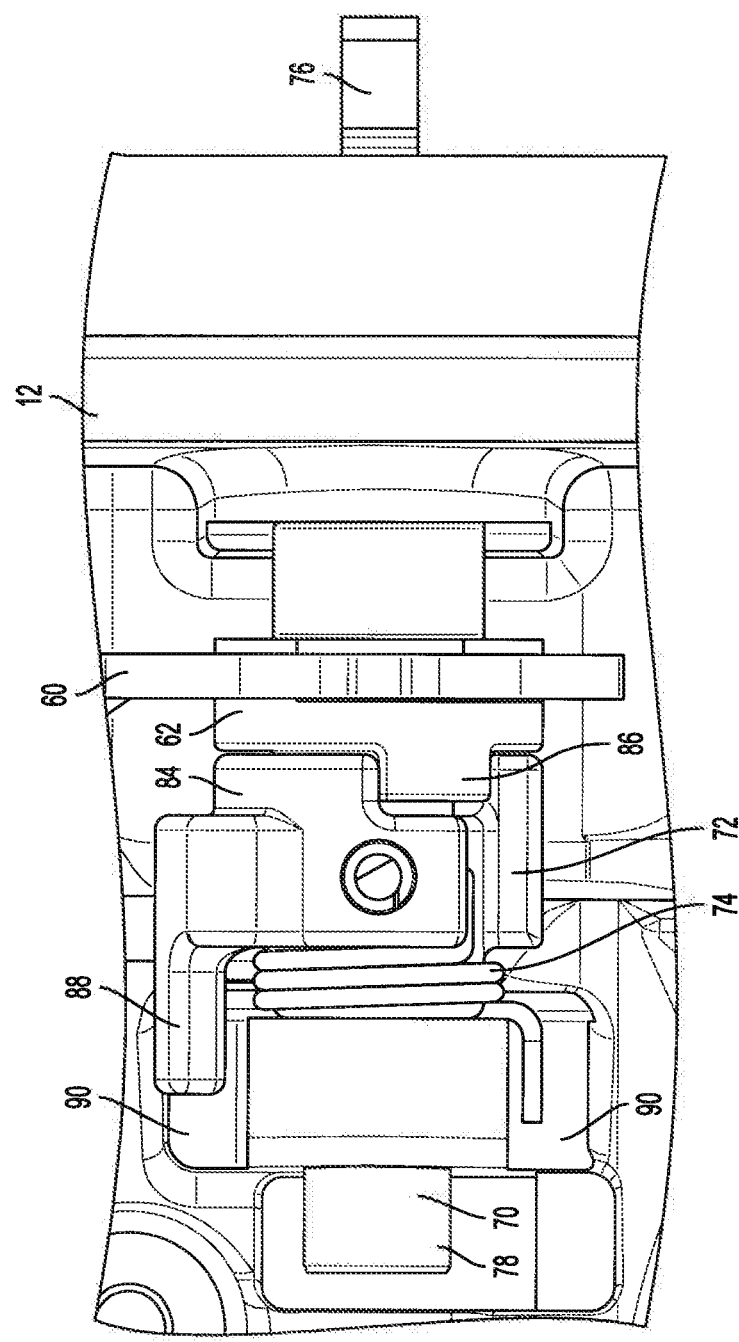
FIG. 4 is a top view of the park system portion shown in FIG. 3, in accordance with the principles of the present application.

With further reference to FIGS. 3-5, in the example embodiment, lost motion shifter assembly 32 generally includes a shift pin or shaft 70, a shaft hub 72, and a biasing mechanism or shaft return spring 74. Shift shaft 70 extends through hub aperture 64 and includes a portion or first end 76 and a second end 78. First end 76 is configured to extend outside of transmission housing 12 (see FIG. 1) and is configured to couple to the manual park release cable 104 via the release lever 102. A seal 80 is configured to provide sealing between transmission housing 12 and the shift shaft 70.

Shaft hub 72 is disposed about shift shaft second end 78, and a coil pin 82 (FIGS. 5 and 6) couples the shift shaft 70 to the shaft hub 72 such that they rotate together. A stop 88 is configured to engage housing surfaces 90 to limit rotation of shaft hub 72 (see FIG. 3). Shaft return spring 74 is configured to maintain the shaft hub 72 and thus shift shaft 70 in the park position (shown in FIG. 5A). In alternative embodiments, spring 74 is removed and a biasing mechanism 108 (e.g., a spring) is disposed in cable shifter 104 (see FIG. 1). In such arrangements, biasing mechanism 108 is configured to bias the cable shifter 104 and thus the shift shaft 70 into a particular position (e.g., the park position).

Figure 6:
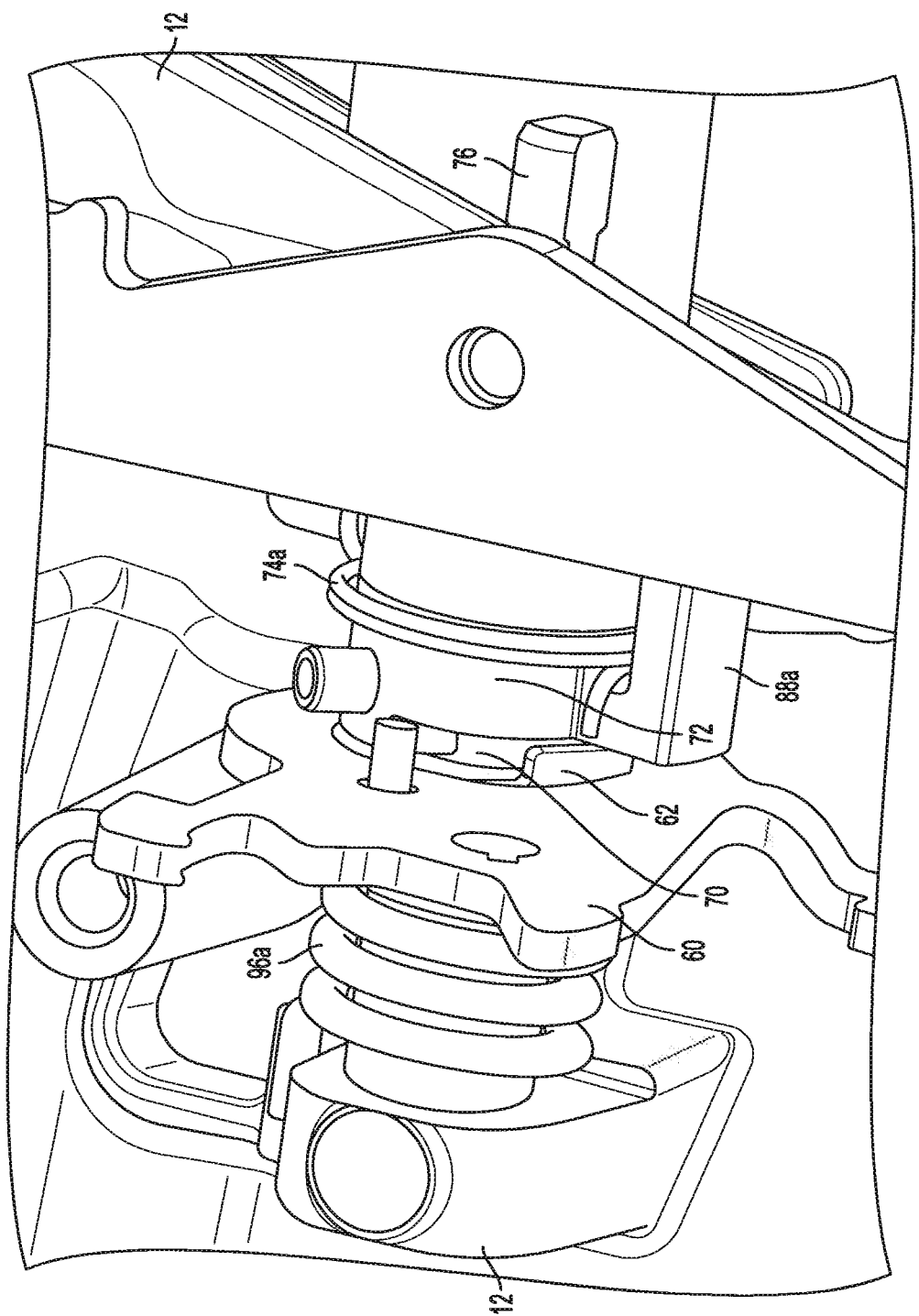
FIG. 6 is a perspective view of an alternative example of the park system portion shown in FIGS. 3 and 4, in accordance with the principles of the present application.

FIG. 6 illustrates an alternative embodiment of lever and hub assembly 30 and lost motion manual shifter assembly 32. In the illustrated example, the system includes an actuator biasing member 96a disposed about shift shaft 70. The actuator biasing member 96a is configured to bias actuator assembly 34 into a particular position (e.g., the park position). In some examples, shaft hub 72 optionally includes a stop 88a and a shaft return biasing mechanism 74a, which is similar to biasing mechanism 74.

Lost motion shifter assembly 32 is configured such that shift shaft 70 does not rotate during normal park shifting operation utilizing actuator assembly 34. Rather, lost motion shifter assembly 32 only rotates when the manual park release system 100 is utilized. As such, during normal park shifting, the lever and hub assembly 30 can rotate into and out of park without applying any torque to the shaft hub 72 or the shift shaft 70.

In the example embodiment, actuator assembly 34 is a hydraulic piston assembly that generally includes an actuator 92, a piston 94, and an actuator biasing member 96. However, it will be appreciated that park shifting system 14 can include any suitable actuator that enables system 14 to function as described herein. The actuator biasing member 96 (e.g., a spring) biases piston 94 outward into the park position (FIG. 2) when hydraulic pressure is lost. When hydraulic pressure is supplied to actuator 92, piston 94 is retracted. In the illustrated example, biasing member 96 is shown externally, however in other arrangements, biasing member 96 may be disposed internally within an actuator assembly outer housing 98.

Figure 5C:
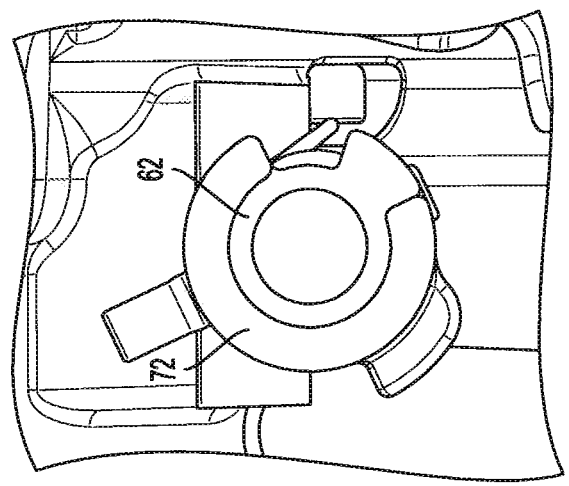
FIG. 5C is a schematic illustration of the lost motion shifter assembly shown in FIG. 5A in a third position, in accordance with the principles of the present application.
Figure 5B:
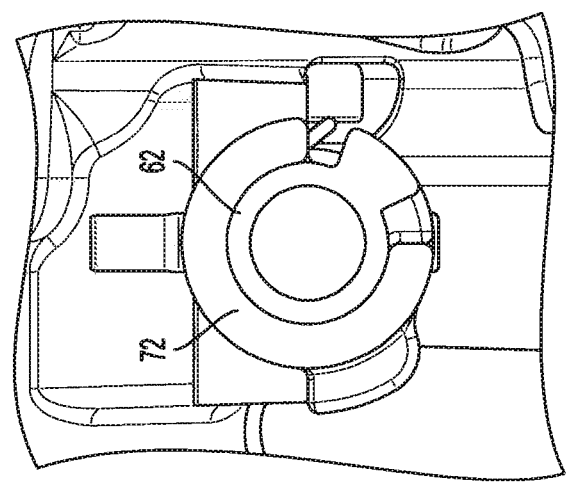
FIG. 5B is a schematic illustration of the lost motion shifter assembly shown in FIG. 5A in a second position, in accordance with the principles of the present application.
Figure 5A:
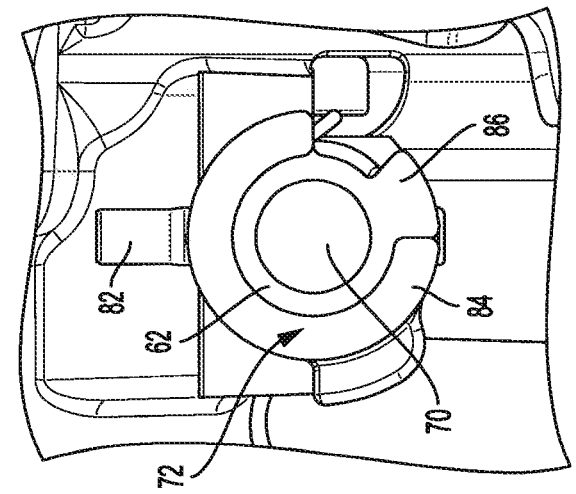
FIG. 5A is a schematic illustration of the lost motion shifter assembly shown in FIG. 3 in a first position, in accordance with the principles of the present application.

In operation, vehicle park shifting system 14 begins in the park position shown in FIGS. 2 and 5A. Upon supplying actuator assembly 34 with hydraulic pressure, piston 94 is withdrawn which rotates lever and hub assembly 30 counterclockwise (as shown in FIG. 2) and pulls park rod 50 toward actuator assembly 34. In this way, lever hub 62 is rotated to the position shown in FIG. 5B, but does not impart any rotational movement to the shift shaft 70 or shaft hub 72.

Movement of the park rod 50 draws cam member 54 toward actuator assembly 34 such that park pawl distal arm 44 slides downwardly along the ramp of withdrawn cam member 54. As such, park pawl 24 rotates about pivot pin 22 and out of engagement with park gear 20. Accordingly, transmission 10 is shifted out of the park position.

The transmission 10 is returned to the park position by removing the hydraulic pressure from actuator assembly 34 such that piston 94 is biased by biasing mechanism 96 into the extended position, which rotates lever and hub assembly 30 clockwise (as shown in FIG. 2) and pushes park rod 50 away from actuator assembly 34. In this way, lever hub 62 is rotated back to the position shown in FIG. 5A without imparting any rotational movement to the shift shaft 70 or shaft hub 72.

Movement of the park rod 50 pushes cam member 54 toward guide assembly 26 such that park pawl distal arm 44 slides upwardly along the ramp of cam member 54. As such, park pawl 24 rotates about pivot pin 22 into engagement with park gear 20. Accordingly, transmission 10 is shifted into the park position.

In the event the vehicle is in the park position but cannot be shifted out of park normally with the vehicle shifter (e.g., a vehicle power loss), the manual park release cable can be accessed and actuated. For example, the manual park release system 100 can be pushed/pulled via a manual park release mechanism 106 (schematically shown in FIG. 1) operated by the vehicle driver. Pushing or pulling the manual park release cable 104 causes rotational movement of the release lever 102, which is coupled to shift shaft first end 76 disposed outside of the transmission housing 12.

Rotation of the shift shaft 70 thereby rotates the shaft hub 72 in a counterclockwise direction (as shown in FIGS. 5A and 5C). At least one first tab 84 of the shaft hub 72 engages a second tab 86 of the lever hub 62, thereby causing rotation of the lever and hub assembly 30. As discussed above, such rotation causes park rod assembly 28 to move park pawl 24 to the out-of-park position, thereby enabling the vehicle to be moved (e.g., towed) when the normal shifting operation is otherwise inoperable.

Described herein are systems and methods for providing a vehicle park system with a lost motion manual park release system that is not operated during normal shifting operation. As such, a lost motion device allows for the transmission to shift in and out of park without rotating any shafts/levers external to the transmission. A split hub design includes a first hub connected to the park system and allows it to shift in and out of park during normal shift operations without rotating a second hub connected to the external lever. In the event the transmission is stuck in park, the external lever can be rotated using a manual park release cable. A park rod is directly connected to the shift system and an internal lever is connected to a shift shaft to allow free movement during normal park operation, but can manually put the system out of park using an external lever and manual park release cable in the event of being stuck in park or power loss. Accordingly, the system eliminates any moving parts external to the transmission during normal shift operations, reducing the occurrence of debris jamming the shifter. As such, no special levers, lost motion devices, or deflection shields are required external to the transmission, thereby reducing components and cost of the vehicle.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. An electronically shiftable transmission, comprising:
a housing;
a park gear; and
a vehicle park shifting system configured to selectively engage the park gear to shift the transmission into and out of a park position, the vehicle park shifting system including:
 a linkage operably associated with the park gear;
 a lever and hub assembly including a lever hub coupled to and extending through a lever, the lever operably coupled to the linkage;
 an actuator assembly operably coupled to the lever and configured to be actuated to selectively move the lever to thereby move the linkage into and out of engagement with the park gear; and
 a lost motion manual shifter assembly including:
  a shift shaft rotatably disposed at least partially within the housing and extending through the lever and the lever hub, the shift shaft configured to couple to a manual park release system utilized to manually shift the transmission into and out of park without utilizing the actuator assembly;
  a shaft hub coupled about the shift shaft for rotation therewith and including a first tab that selectively engages a second tab of the lever hub to transfer rotational movement therebetween; and
  a biasing mechanism disposed around the shift shaft with a first end engaged with the housing and a second end engaged with the shaft hub, the biasing mechanism configured to bias the shaft hub and the shift shaft into a park position where the first tab is disengaged from the second tab,
  wherein rotation of the shift shaft by the manual park release system causes rotation of the shaft hub such that the first tab engages the second tab to rotate the lever hub, which rotates the lever and moves the linkage out of engagement with the park gear;
 wherein actuation of the actuator assembly does not impart rotational movement to the shift shaft.

2. The transmission of claim 1, wherein the lost motion manual shifter assembly further includes a coil pin extending through the shaft hub and the shift shaft to couple the shaft hub to the shift shaft.

3. The transmission of claim 1, wherein the actuator assembly includes a hydraulic actuator, a piston, and a piston biasing mechanism,
wherein the piston biasing mechanism biases the piston into a first position where the piston engages the lever and moves the linkage into engagement with the park gear, and
wherein hydraulic pressure supplied to the hydraulic actuator moves the piston into a second position where the piston engages the lever and moves the linkage out of engagement with the park gear.

4. The transmission of claim 3, wherein the linkage further includes a park rod assembly comprising:
a park rod having a first end coupled to the lever, and a second end;
a cam member disposed at least partially about the park rod second end; and
a cam biasing mechanism configured to bias the cam member outwardly away from the park rod second end.

5. The transmission of claim 4, wherein the cam member includes a ramped outer surface.

6. The transmission of claim 5, further comprising a guide assembly coupled to the housing and defining a guide surface to receive and guide the cam member.

7. The transmission of claim 5, wherein the linkage further includes a park pawl rotatably coupled about a pivot pin, wherein the park pawl includes an engagement arm engaged with the cam member, and an engagement tooth configured to selectively engage the park gear.

8. The transmission of claim 1, wherein the transmission is an electronic shift-by-wire transmission, and the vehicle park shifting system is a hydraulic vehicle park shifting system with an electronically controlled actuator assembly.

9. A vehicle comprising:
a manual park release system; and
an electronically shiftable transmission including:
 a housing;
 a park gear; and
 a vehicle park shifting system configured to selectively engage the park gear to shift the transmission into and out of a park, the vehicle park shifting system including:
 a linkage operably associated with the park gear;
 a lever and hub assembly including a lever hub coupled to and extending through a lever, the lever operably coupled to the linkage;
 an actuator assembly operably coupled to the lever and configured to be actuated to selectively move the lever to thereby move the linkage into and out of engagement with the park gear; and
 a lost motion manual shifter assembly including:
  a shift shaft rotatably disposed at least partially within the housing and extending through the lever and the lever hub, the shift shaft configured to couple to a manual park release system utilized to manually shift the transmission into and out of park without utilizing the actuator assembly;
  a shaft hub coupled about the shift shaft for rotation therewith and including a first tab that selectively engages a second tab of the lever hub to transfer rotational movement therebetween; and
  a biasing mechanism disposed around the shift shaft with a first end engaged with the housing and a second end engaged with the shaft hub, the biasing mechanism configured to bias the shaft hub and the shift shaft into a park position where the first tab is disengaged from the second tab, wherein rotation of the shift shaft by the manual park release system causes rotation of the shaft hub such that the first tab engages the second tab to rotate the lever hub, which rotates the lever and moves the linkage out of engagement with the park gear;

wherein actuation of the actuator assembly does not impart rotational movement to the shift shaft.

10. The vehicle of claim 9, wherein the manual park release system comprises:

a release lever coupled to the shift shaft outside of the housing;

a manual park release mechanism configured to be manipulated by a driver; and a manual release cable coupled between the release lever and the manual park release mechanism.

11. The vehicle of claim 10, further comprising a biasing mechanism operably associated with the manual release cable to bias the release lever into a first position.

12. The vehicle of claim 9, wherein the transmission is an electronic shift-by-wire transmission, and the vehicle park shifting system is a hydraulic vehicle park shifting system with an electronically controlled actuator assembly.

* * * * *